ions, or

United States Patent
Ryu et al.

[11] 3,879,736
[45] Apr. 22, 1975

[54] HIGH FREQUENCY-CUT FILTER FOR A PEN RECORDER

[75] Inventors: Akinobu Ryu; Takehiro Okumura, both of Okumura, Katsuta; Yukio Yoshinari, Tojuku, all of Japan

[73] Assignee: Hitachi, Ltd., Tokyo, Japan

[22] Filed: May 10, 1973

[21] Appl. No.: 358,942

[30] Foreign Application Priority Data
May 10, 1972  Japan.............................. 47-45481

[52] U.S. Cl............... 346/33 R; 333/70 R; 333/79; 346/146
[51] Int. Cl. ........................................ G01d 5/12
[58] Field of Search................. 346/33 R, 32, 146; 333/70 CR, 70 R, 79

[56] References Cited
UNITED STATES PATENTS

| | | | |
|---|---|---|---|
| 1,978,098 | 10/1934 | Alexander et al. .............. | 333/79 X |
| 2,144,950 | 1/1939 | Wiessner....................... | 333/79 X |
| 2,367,746 | 1/1945 | Williams...................... | 333/70 CR X |
| 2,777,998 | 1/1957 | Shepherd...................... | 333/79 X |
| 3,158,026 | 11/1964 | McGhee ........................ | 346/32 X |

Primary Examiner—Joseph W. Hartary
Attorney, Agent, or Firm—Thomas E. Beall, Jr.

[57] ABSTRACT

A high frequency-cut filter is provided for a pen recorder having a high response rate, and is directly connected to the input terminals of the pen recorder with a shield, which may include a part of the recorder case, for shielding it from the other circuits of the recorder with respect to electric field or electromagnetic waves. Preferably, the filter has two input terminals for receiving the recording signal, two output terminals, a first inductor connected between the first input and first output terminals, a first capacitor connected between either the first and second input terminals, or the first output terminal and second input terminal, a second capacitor connected between the second input terminal and an electrical ground, a second inductor connected between the second input terminal and second output terminal, and a third capacitor connected between the second output terminal and the electrical ground. Also, a high frequency-cut filter may be employed for the paper feed control signal.

11 Claims, 8 Drawing Figures

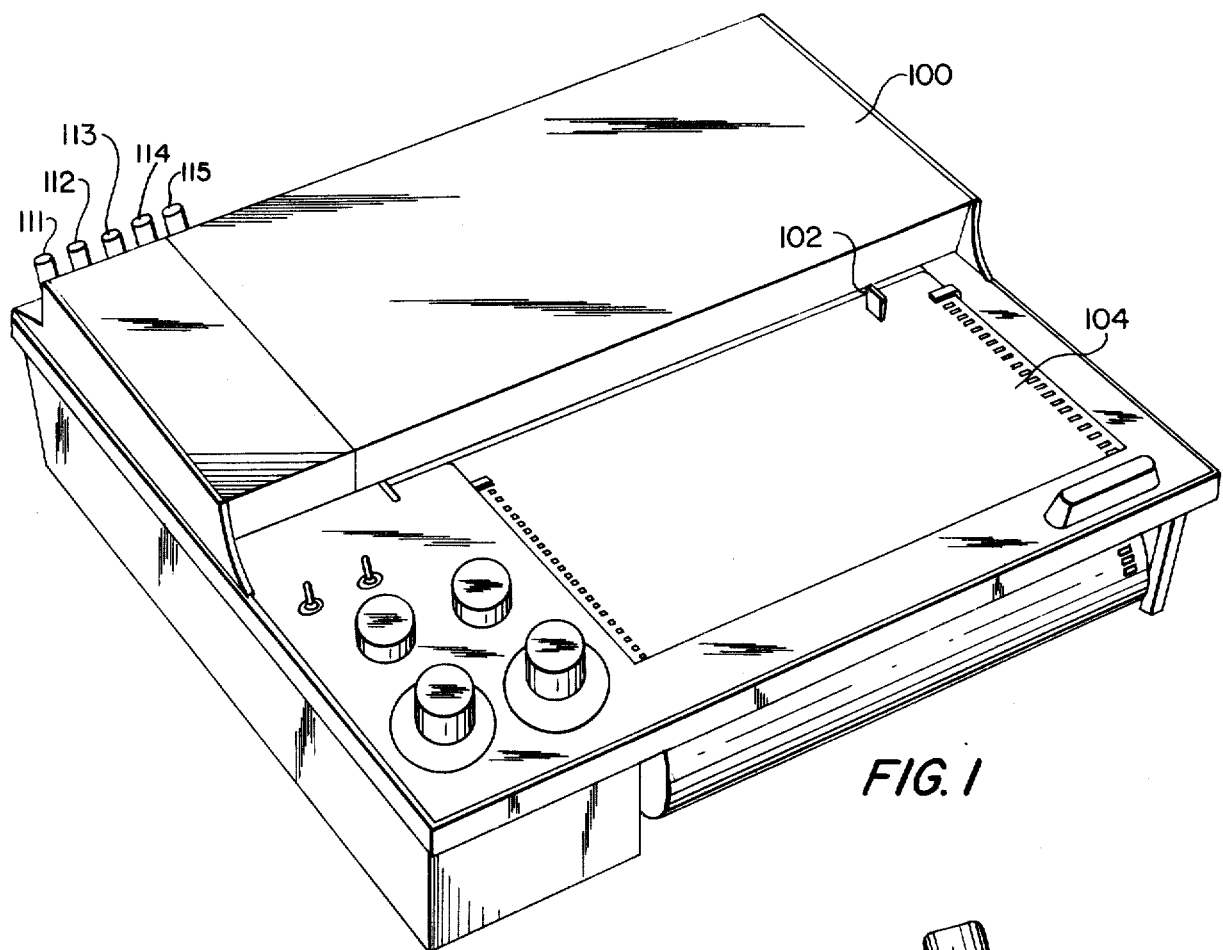
FIG. 1
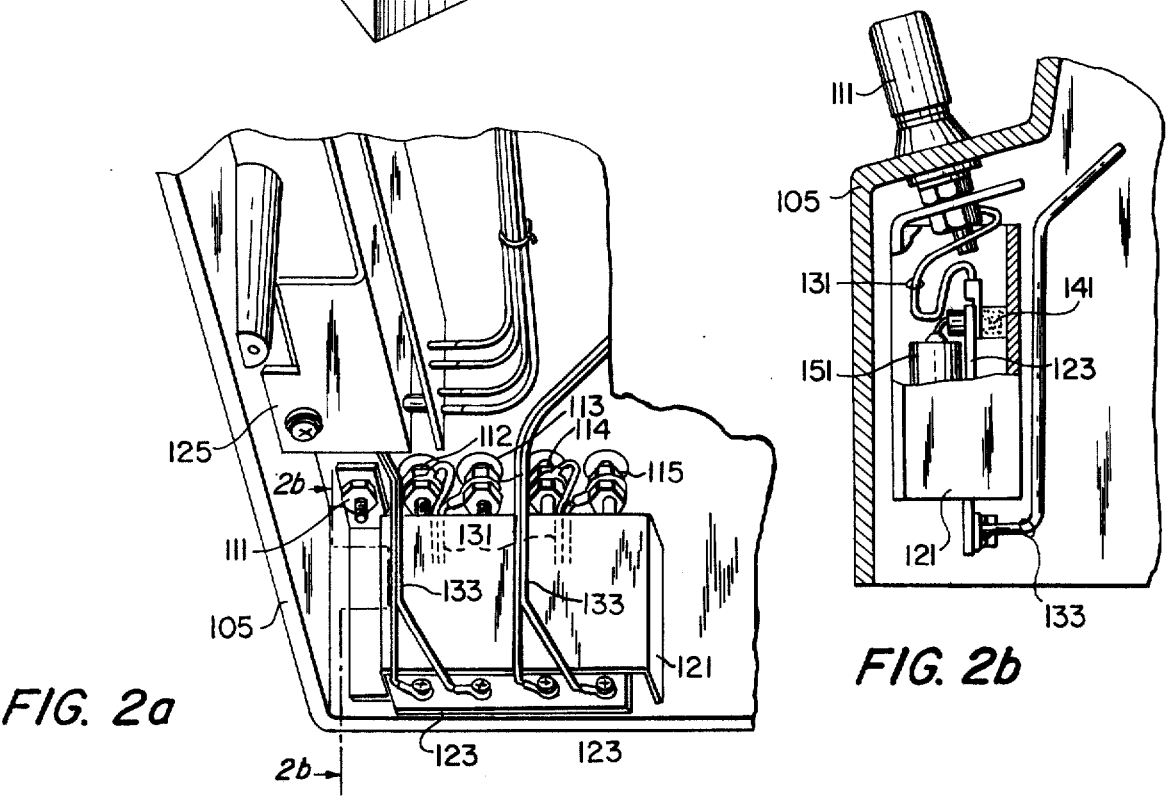
FIG. 2a
FIG. 2b

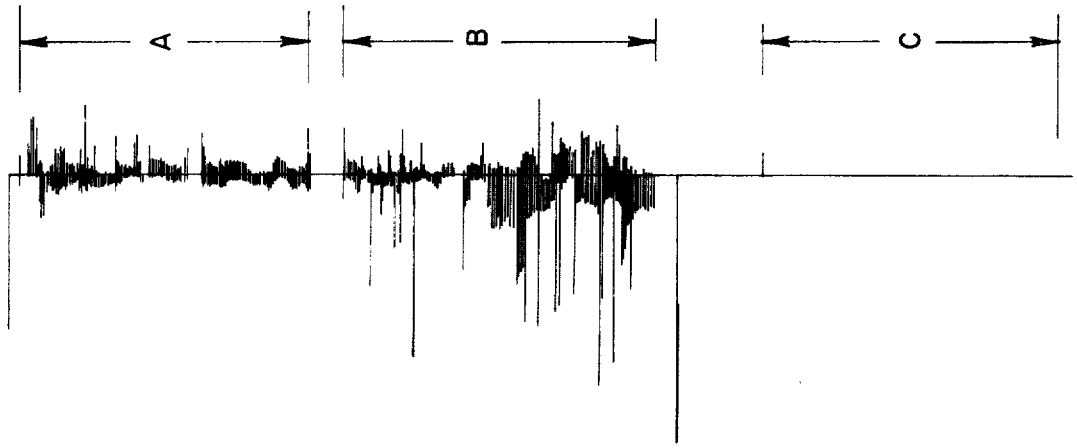
FIG. 6
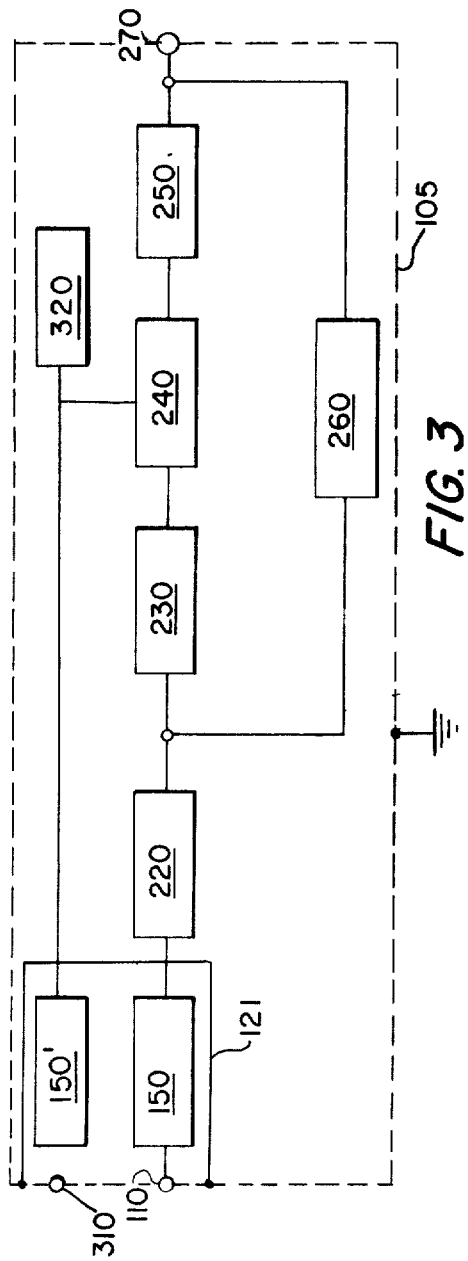
FIG. 3
| | PRIOR ART | PRIOR ART | PRESENT INVENTION |
|---|---|---|---|
| VALUE OF INFLUENCE BY NOISES ENTERING FROM INPUT SIGNAL LINE | 1 SEC | 0.5 SEC | 0.5 SEC |
| WITH INPUT SIGNAL LINE SET APART BY 30cm FROM NOISE GENERATING SOURCE | 1% | 1.5% | 0.3% |
| WITH INPUT SIGNAL LINE WOUND AROUND NOISE GENERATING SOURCE | 3.5% | 6.5% | 1% |
FIG. 7

3,879,736

HIGH FREQUENCY-CUT FILTER FOR A PEN RECORDER

BACKGROUND OF THE INVENTION

It is well known that a pen recorder is generally an instrument in which a servomotor is driven in response to an input signal, with rotation of the servomotor being transmitted through a pulley and reeling string to a recording pen in order to move the recording pen according to the input signals, whereby the characteristics of the input signal are recorded on recording paper that is continuously delivered to the recording pen by means of usually a sprocket drive.

In recent years, there have been requirements that the response rate or speed of the recording pen be higher than the value of 1,000mm/sec. Such a recording pen has already been put into practical use. However, these high speed recorders will record more noise on the recording paper than will be recorded by the older slow response rate pen recorders. Since the slow response rate pen recorder has a large time constant, it cannot respond to a short-time output change of an amplifier as caused by interferring noises, so that these noises will not be recorded. However, the high response rate pen recorder can follow the short-time output change of the amplifier as caused by noise.

A pen recorder is usually used in combination with chemical or physical equipment that is being monitored or is monitoring, which equipment will cause various noises in the signal to be recorded. For example, a compressor or a motor repeats its start and stop, and relays will turn on and off, all of which will repeat their cycles frequently. These noises are transmitted to the pen recorder circuits, lines and the like through space.

Up to now, it has been thought that the noises that have been transmitted through space do not effect the pen recorder, because the frequency of these noises that travel through space is higher than 100KHz, and almost all of them are higher than 500KHz. It was thought that these high frequency noises would not effect the recorder, because these frequencies are too high to move the recording pen having a 1,000mm/sec recording speed.

These high frequency noises are not only caused by chemical and physical equipment, but also by electric waves of a radio, a television, or wireless telegraphy.

In conventional pen recorders, a filter may be used for removing commercial supply frequency noises, which may be caused by a voltage supply used to provide the power for the pen recorder. Such a supply voltage would be commonly obtained from a wall outlet and may be 60 cycle, 110 volt power. The conventional filter for these relatively low commercial frequency noises is located closely adjacent the amplifier circuit and separated from the input terminals of the pen recorder. Therefore, the previously mentioned high frequency noises and the electric field and electromagnetic field waves that they produce will enter the recorder case and circuits without being effected by the conventional low frequency filter.

SUMMARY OF THE INVENTION

As part of the present invention, the following characteristics of high speed pen recorders have been determined. The input signal lead lines which are connected between the input terminals of the pen recorder and a signal source remote from the pen recorder, for transmitting the signals, will receive electromagnetic wave noises through space from various noise sources, such as magnetic relays or motors. These noises will then be led into the pen recorder housing by means of the lead lines and input terminals, so that they may thereafter be transmitted to other circuits within the pen recorder that are nearer the input terminals through the various electrical lines or through the space separating the components that will act as capacitors, since these noises are of a high frequency. Thereafter, the noises are rectified by the semi-conductor devices that are commonly provided in the amplification circuit of the pen recorder. Since the amplification circuit is usually constructed of an IC type or printed circuit, the various components or elements are very closely adjacent each other. For high frequency noises, every element or component of the circuit may be considered as an element being randomly connected to other elements or components of the circuit with many capacitors. The noises will then be transmitted to every circuit in the pen recorder through these effective capacitors and rectified by any semiconductor devices in the circuit. Some of these rectified noises will be applied to the servomotor for driving the recorder pen. These rectified noises will have a low frequency component or DC component which can drive the high speed recorder pen.

Accordingly, it is the principal object of the present invention to understand the above phenomena and apply it by providing an improved filter system for a high speed pen recorder, whereby the pen recorder will not be effected by high frequency noise caused by the operation of relays or motors or by electric wave sources such as radio or television. Therefore, the present invention relates to a high frequency-cut filter for a high speed pen recorder and particularly to remove the noises that are accompanied by high frequency electromagnetic waves or by high frequency vibration of an electric field.

The pen recorder of the present invention has a high frequency cut filter connected closely adjacent the input terminals of the recorder and shielded by shielding means from the remaining circuits and components of the pen recorder to prevent the transmission of high frequency noises from the input terminals or from the high frequency-cut filter to the other circuit components of the pen recorder, particularly the amplifier circuit.

The electric circuits, particularly the amplifier circuit, commonly found in a pen recorder are covered by a metal housing. High frequency noises cannot enter into the pen recorder housing except through the input terminals due to the shielding effect of the housing. However, these high frequency noises can enter the housing through the input terminals by means of the recording signal or a paper feed control signal. Therefore when the high frequency noise from the input terminals is removed by a high cut filter and prevented from traveling through the space within the recorder housing by means of shield means, the pen recorder will be protected from the high frequency noise.

BRIEF DESCRIPTION OF THE DRAWING

Further objects, features and advantages of the present invention will become more clear from the following detailed description of a preferred embodiment of the invention, as shown in the accompanying drawing, wherein:

FIG. 1 is a perspective view of the external appearance of a pen recorder, having the high frequency-cut filter of the present invention;

FIG. 2a is a bottom perspective view of the back of the input terminals of the pen recorder as shown in FIG. 1;

FIG. 2b is a partial cross-sectional view taken along line 2b—2b of FIG. 2a;

FIG. 3 is a block diagram showing an embodiment of the basic components of the present invention;

FIG. 6 shows the recording results of a pen recorder having a response speed of 0.5 seconds and effected by interferring noises; and FIG. 7 is a table listing the influence of noises on a pen recorder according to the present invention and according to the prior art.

DETAILED DESCRIPTION OF A PREFERRED EMBODIMENT

Figures 4, 5:
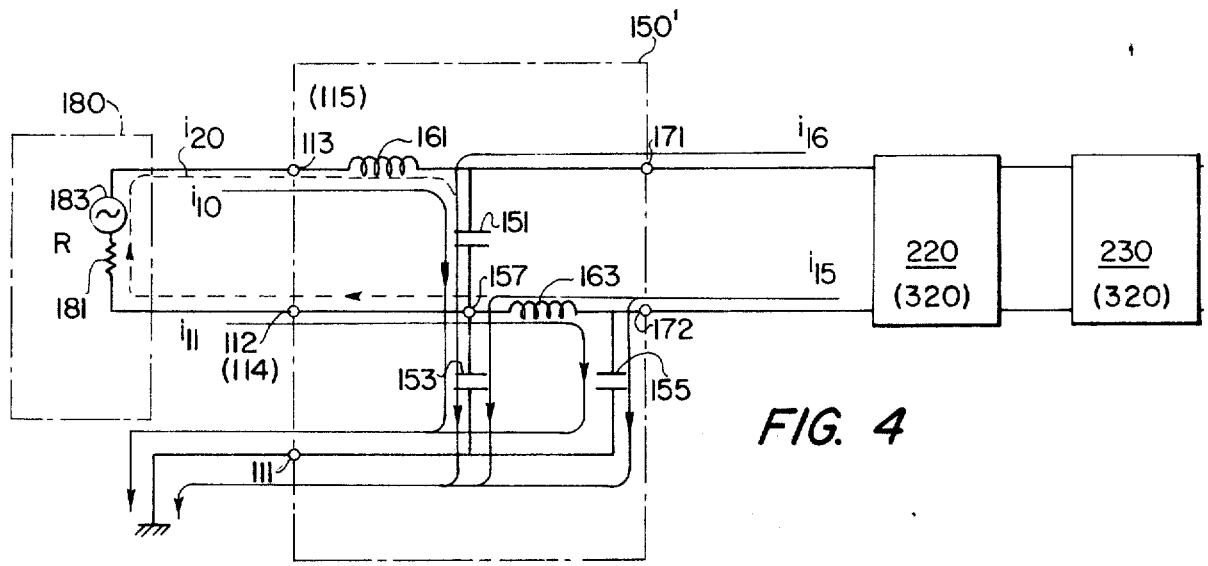
FIG. 4 is a practical schematic circuit diagram of the high frequency-cut filter in relationship to the other components of the pen recorder.
FIG. 5 is a plot of the high frequency attenuating characteristics of the high frequency-cut filter circuit as shown in FIG. 4.

The high response rate or speed recorder 100 employing the features of the present invention as shown in FIG. 1 has input terminals 111, 112, and 113 for conducting signals to be recorded to the interior components of the pen recorder for driving a recording pen 102, which will record the characteristics of the input signal or signals on the recording paper 104. In a conventional manner, the recording paper 104 is driven in one planar direction by a sprocket drive according to a power source constant speed or according to a paper feed control signal supplied to input terminals 114, 115, and the recording pen 102 is driven by a servomotor along a line perpendicular to the direction of drive for the recording paper 104 in response to the recording signals.

In FIG. 2a, there is shown the back view of the input terminals, which view is afforded by the removal of the bottom or base plate (not shown) of the pen recorder case or housing. FIG. 2b is a partial cross-sectional view taken along the line 2b—2b of FIG. 2a, showing an arrangement of the shield member. The input terminals 111, 112, 113, 114, 115 are passed through the top wall of the metal case 105 with the interposition of insulators for at least the terminals 112, 113, 114, 115. The case 105 includes a top wall, four side walls, and a removable bottom wall all of metal and at electrical ground potential. Further, the terminal 111 and the bent sheet metal shield member 121 are electrically connected to the case 105 so as to be at ground potential.

The shield member 121 encloses on three sides the high frequency-cut filter that is enclosed on its fourth side by means of the case 105, so that access to the high frequency-cut filter is only provided adjacent the input terminals 112, 113, 114, 115 closely adjacent the top wall and at the opposite end closely adjacent the bottom wall.

The high frequency-cut filter includes a circuit board 123 that is supported on the shield member 121 by means of insulated spacer 141. The inputs for the filter are closely adjacent to and connected to the input terminals 112, 113, 114, 115 through lines 131 and further to the ground terminal 111, and the filter further has an output closely adjacent the bottom wall (not shown) that is connected to the amplifier circuit 125 through electrical lines 133 and a second filter (not shown), with the lines 133 passing entirely outside of the shield member 121. As shown, the circuit board 123 carries the electrical components of the filter, one of which is the capacitor 151. Since the distance between the input terminals 111, 112, 113, 114, 115 and the high frequency-cut filter having the shield 121 is very short, noises that will enter the pen recorder case by means of the input terminals 111, 112, 113, 114, 115 will almost completely be removed and the emission of the noises to other electrical circuits will not occur. It is desirable to cover the input terminals with shield members to remove the possibility of the high frequency noises being transferred to other components through space.

As shown in the block diagram of FIG. 3, the high frequency-cut filter as partially described with respect to its physical characteristics in relation to FIGS. 2a and 2b is shown in the diagram as component 150 and component 150'. The filter component 150 is in series with a second filter 220 that attenuates commercial frequency noise and a second higher harmonic component thereof, and further in series with an amplifier 230 for amplifying the filtered input signal. The recording pen 270 is displaced or driven by a servomotor 240 and a reduction gear mechanism 250 in order to record the characteristics of the input signal from the input recording terminals 111, 112, 113, which are represented in the diagram as input 110. Further, a potentiometer 260 is provided for adjustment purposes. The paper feed control signal is provided at input terminal 310 (which represents paper feed control input terminals 114, 115 of FIG. 1) leading to the high frequency-cut filter component 105' housed within shield means 121. Thereafter, the paper feed control signal is fed to the servomotor 240 for controlling movement of the pen toward the paper and to the motor 320 for controlling the starting, stopping and speed of the paper feed, in a conventional manner.

In FIG. 4, there is shown a practical circuit diagram that is identical for the filter components 150 and 150' of FIG. 3 with the numerals that would be applicable to component 150' being placed in parenthesis. It is seen that the high frequency-cut filter 150 or 150' component has capacitors 151, 153, 155 and inductors 161, 163. Since the operation of the filter will be identical for components 150 and 150', only the operation for component 150 will be set forth in detail below. The input terminals 112, 113 for the recording signal are connected to a signal source 180 that may be represented as having an internal resistance 181 and an internal equivalent signal generator 183. High frequency noise represented as $i_{10}$, $i_{11}$ will be received and transmitted by the lead lines that are provided between the output of the signal source 180 and the input terminals 113, 112, respectively. These high frequency noisess will flow into the ground as shown by the solid arrowed flow lines through the inductor 161 and the capacitors 151, 153, and further through the inductor 163 and the capacitor 155. Therefore, the high frequency noises are completely removed by the high frequency-cut filter component 150. Additionally, the high frequency-cut filter component 150 can remove leak currents $i_{15}$ and $i_{16}$ that may originate from an A.C. commercial voltage supply for the pen recorder. If the leak currents were allowed to flow through the resistor 181, a voltage caused between the ends of the resistor 181 would act as an error. However, according to the present invention, these leak currents from the commercial voltage supply will not pass through the resistor 181, because the closed circuit consisting of the resistor 181, the internal equivalent signal generator 183, the inductor 161 and the capacitor 151 has only one generator and all currents passing to the ground must be passed through a point 157, so that only the current caused by the generator 183 will flow in this closed circuit and no other current including the leak current will flow in this closed circuit. Therefore, the leak current $i_{15}$, $i_{16}$ cannot pass through the resistor 181. Thus, the amplifier 230 will receive a correct voltage from the signal source 180 through the high frequency-cut filter component 150 and the second filter 220.

The illustrated embodiment of the high frequency-cut filter component 150 as shown in FIG. 4 comprises a first recording signal input terminal 113, a second recording signal input terminal 112, an electrical ground 111, a first output terminal 171, a second output terminal 172, a first inductor 161 electrically connected between the first input terminal 113 and the first output terminal 171, a first capacitor 151 electrically connected between the first output terminal 171 and the second input terminal 112, a second inductor 163 electrically connected between the second input terminal 112 and the second output terminal 172, a second capacitor 153 electrically connected between the second input terminal 112 and the electrical ground 111, and a third capacitor 155 electrically connected between the second output terminal 172 and the electrical ground 111.

The above specifically shown embodiment of the high frequency-cut filter component 150 may be modified by removing the capacitor 151 from its illustrated position in the circuit and reinserting it directly electrically between the first input terminal 113 and the second input terminal 112, with the remainder of the circuit being otherwise the same and of course there being no direct electrical connection between the first output terminal 171 and the second input terminal 112 after the capacitor 151 has been relocated.

FIG. 5 shows the high frequency eliminating characteristics of the high frequency-cut filter component 150 of FIG. 4. It is seen from the plot that the amount of attenuation was 40dB for frequencies between 500KHz and 50MHz.

FIG. 6 shows the recording results of a pen recorder having a response speed of 0.5 seconds with interferring noises in the case where the input recording signal was null and where a small sized relay was continuously turned on and off near the lead lines for the input recording signal as a noise source, so that the recording signal would only contain high frequency noise.

In FIG. 6, the section A of the recording signal as recorded on the recording paper by the recorder pen corresponds to the situation where the signal input line leading to the recorder for the input recording signal was spaced 10cm from the small sized relay. The section B of the recording on the paper corresponds to the situation where the recording signal line or input line (2.5m) was wound around the small sized relay. With respect to each of the recording sections A and B, the high frequency-cut filter of the present invention was not provided for the high speed recorder, and as can be seen the interferring noises produced by the small sized relay were recorded on the paper. The section C of the recording paper corresponds to the situation where the high frequency-cut filter of the present invention was employed in the same pen recorder and the recording signal line (2.5m) leading to the recorder input terminal was wound around the small sized relay. It is thus seen that with respect to sections B and C, the noise within the recording signal line leading to the input terminal of the recorder should be substantially the same. However, with the high frequency-cut filter of the present invention it is seen that the noise was not recorded by the pen.

FIG. 7 lists the proportions or percentage of the interferring noise passed by the prior art and the present invention. According to the present invention, the influence of the interferring noise can be more largely reduced for a recorder having a high response speed of 0.5 seconds than even for a recorder having a lower response speed of 1 second.

FIGS. 6 and 7 correspond to the situation where only the recording signal input terminals of the recorder were provided with the high frequency eliminating or cut filter of the present invention. When both the recording signal input terminals and the paper feed control signal terminal are provided with the high frequency-cut filter of the present invention, the influence of the high frequency interferring noises can be made even less than shown in FIGS. 6 and 7, that is, even less than when only the recording signal input terminals is provided with the high frequency-cut filter.

As seen from the above, the circuit arrangement as shown in FIG. 4 will eliminate the high frequency interferring noises brought into the recorder by the input terminals; and the shield means 121 will prevent the high frequency interferring noises within the input terminals of the recorder, the input terminals of the filter, and the various lines of the filter that carry these high frequency noise components to the ground from passing electric field and electromagnetic waves through space to be picked up by other electrical components of the recorder, such as those of the amplifier circuit.

As described above, according to the present invention, the influence of the high frequency interferring noises can be sharply decreased, and the recording can be correctly effected by merely providing the high frequency-cut filter. Further, if the high frequency-cut filters are provided at both the input terminals of the recording signal and the paper feed control signal terminal, the influence of the high frequency interferring noises can be made still less.

While a preferred embodiment of the present invention has been specifically illustrated along with various modifications and the details are important according to the more narrow aspects of the present invention, further modifications, embodiments and variations are contemplated within the spirit and scope of the present invention as determined by the following claims.

What is claimed is:

1. In a high speed pen recorder having a recorder pen, input terminal means for receiving recording signals and carried high frequency noises from outside the recorder, amplifier circuit means connected to said input terminal means for receiving and amplifying the recording signals, and servomotor means connected to said amplifier means for receiving the amplified recording signals and connected to said recorder pen for moving the recorder pen in response to the amplified recording signals, wherein the improvement comprising: high frequency-cut filter means adjacent said input terminal means and connected between said input terminal means and said amplifier means for passing the recording signals and for removing the high frequency noises from the recording signals prior to the recording signals reaching said amplifier circuit means; and shield means preventing the transmission through space of the high frequency noises having frequency components higher than 100KHz from both said input terminal means and said high frequency-cut filter means to said amplifier circuit means, and said shield means comprising an electrically grounded metal plate extending between said amplifier circuit means and both said input terminal means and said high frequency-cut filter means to be in the path of the high frequency noises in space transmitted from said input terminal means and said high frequency-cut filter means toward said amplifier means.

2. The pen recorder according to claim 1, further including means for connecting said input terminal means to a commercial power supply; low frequency-cut filter means electrically connected in series between said high frequency-cut filter means and said amplifier means for filtering out the power supply frequency noise and a second higher harmonic component thereof.

3. The pen recorder according to claim 1, wherein said high frequency-cut filter means has an attenuation of at least 40dB within the frequency range of 500KHz and 50MHz.

4. The pen recorder according to claim 1, further including means for feeding a recording paper past and in contact with said recorder pen, and comprising a recording paper drive motor; paper feed control signal input terminal means for receiving a paper feed control signal and accompanying high frequency noises from outside of the recorder; means for conducting said paper feed control signal to said recording paper drive motor to control the feeding of the paper; high frequency-cut filter means adjacent said paper feed control signal input terminal means and connected between said paper feed control signal input terminal means and said recording paper drive motor for removing the high frequency noise from the paper feed control signal prior to the paper feed control signal reaching said recording paper drive motor.

5. The pen recorder of claim 1, wherein said high frequency-cut filter means includes at least two input terminals, at least two output terminals, an inductor electrically mounted between a first one of said input terminals and a first one of said output terminals, a capacitor provided electrically between said output terminals, and the second of said input terminals being grounded.

6. The pen recorder according to claim 1, wherein said high frequency-cut filter means includes at least two input terminals, at least two output terminals, a first inductor electrically connected between a first one of said input terminals and a first one of said output terminals, a second inductor electrically connected between a second one of said input terminals and a second one of said output terminals, an electrical ground, first capacitor means electrically connected between said first output terminal and said ground, and second capacitor means electrically connected between the second one of said output terminals and the ground.

7. In a high speed pen recorder having a recorder pen, input terminal means for receiving recording signals and carried high frequency noises from outside the recorder, amplifier circuit means connected to said input terminal means for receiving and amplifying the recording signals, and servomotor means connected to said amplifier means for receiving the amplified recording signals and connected to said recorder pen for moving the recorder pen in response to the amplified recording signals, the improvement comprising: high frequency-cut filter means connected between said input terminal means and said amplifier means for passing the recording signals and for removing the high frequency noise from the recording signal prior to the recording signal reaching said amplifier circuit means; a grounded metallic housing having upper, side and lower walls forming an interior enclosure having therein said servomotor means and amplifier circuit means; said input terminal means having connector means on the exterior of said housing for making electrical connection with an input wire, insulated electrical leads extending through said housing walls and means within said housing for electrically connecting said connector means of said input terminal means to said high frequency-cut filter means; said high frequency-cut filter means being mounted on one of said walls and having an input immediately adjacent said connector means, and an output on the opposite side of said high frequency-cut filter means from its input; shield means preventing the transmission through space of the high frequency noises from both said input terminal means and said high frequency-cut filter means to said amplifier circuit means, said shield means comprising an electrically grounded metal plate extending around said high frequency-cut filter means to be in the path of the high frequency noises transmitted through space from said input terminal means and said high frequency-cut filter means toward said amplifier means, and having opposite open ends respectively for said high frequency-cut filter means input and output; and electrical wires extending operatively from said high frequency-cut filter means output to said amplifier circuit means completely outside of said shield means.

8. The pen recorder according to claim 7, wherein said input terminals extend through the top wall of said enclosure adjacent one side wall, said shield means being generally channel shaped and with said one side wall forming a tubular enclosure for said high frequency-cut filter means opening toward said top wall and said bottom wall.

9. In a pen high speed recorder having a recorder pen, input terminal means for receiving recording signals and carried high frequency noises from outside the recorder, amplifier circuit means connected to said input terminal means for receiving and amplifying the recording signals, and servomotor means connected to said amplifier means for receiving the amplified recording signals and connected to said recorder pen for moving the recorder pen in response to the amplified recording signals, the improvement comprising: high frequency-cut filter means adjacent said input terminal means and connected between said input terminal means and said amplifier means for passing the recording signals and for removing the high frequency noise from the recording signal prior to the recording signal reaching the amplifier circuit means; said high frequency-cut filter means comprising an electrical ground, first and second input terminals, first and second output terminals, a first capacitor electrically connected between said first and second input terminals, a first inductor electrically connected between said first input terminal and said output terminal, a second inductor electrically connected between said second input terminal and said second output terminal, a second capacitor electrically connected between said second input terminal and the electrical ground, and a third capacitor electrically connected between said second output terminal and the electrical ground.

10. In a pen high speed recorder having a recorder pen, input terminal means for receiving recording signals and carried high frequency noises from outside the recorder, amplifier circuit means connected to said input terminal means for receiving and amplifying the recording signals, and servomotor means connected to said amplifier means for receiving the amplified recording signals and connected to said recorder pen for moving the recorder pen in response to the amplified recording signals, the improvement comprising: high frequency-cut filter means adjacent said input terminal means and connected between said input terminal means and said amplifier means for passing the recording signals and for removing the high frequency noise from the recording signal prior to the recording signal reaching the amplifier circuit means; said high frequency-cut filter means comprising an electrical ground, first and second input terminals, first and second output terminals, a first capacitor electrically connected between said first and second input terminals, a first inductor electrically connected between said first input terminal and first output terminal, a second inductor electrically connected between said second input terminal and said second output terminal, a second capacitor electrically connected between said second input terminal and the electrical ground, and a third capacitor electrically connected between said second output terminal and the electrical ground.

11. In a high speed pen recorder having a recorder pen, input terminal means for receiving recording signals and carried high frequency noises from outside the recorder, amplifier circuit means connected to said input terminal means for receiving and amplifying the recording signals, and servomotor means connected to said amplifier means for receiving the amplified recording signals and connected to said recorder pen for moving the recorder pen in response to the amplified recorder signals, the improvement comprising: high frequency-cut filter means connected between said input terminal means and said amplifier means for passing the recording signals and for removing the high frequency noise from the recording signal prior to the recording signal reaching said amplifier circuit means; shield means preventing transmission through space of the high frequency noises from said input terminal means and said high frequency-cut filter means to said amplifier circuit means and comprising an electrically grounded metal plate extending between said amplifier circuit means and both said input terminal means and said high frequency-cut means; a grounded metallic housing having upper, side and lower walls forming an interior enclosure having therein said servomotor means and amplifier circuit means; said input terminal means having connector means on the exterior of said housing for making electrical connection with an input wire, and means for electrically connecting said connector means of said input terminal means to said high frequency-cut filter means; said high frequency-cut filter means being mounted adjacent one of said walls and having an input immediately adjacent said connector means, and an output on the opposite side of said high frequency-cut filter means from its input; said shield means metal plate extending around said high frequency-cut filter means and having opposite ends opening for respectively passing therethrough said high frequency-cut filter means input and output; and electrical wires extending operatively from said high frequency-cut filter means output to said amplifier circuit means completely outside of said shield means.

* * * * *